United States Patent [19]

Christenson

[11] Patent Number: 4,684,142
[45] Date of Patent: Aug. 4, 1987

[54] STEERABLE AUXILIARY AXLE

[75] Inventor: Ronald E. Christenson, Mantorville, Minn.

[73] Assignee: McNeilus Truck and Manufacturing, Inc., Dodge Center, Minn.

[21] Appl. No.: 847,744

[22] Filed: Apr. 3, 1986

[51] Int. Cl.⁴ .................... B60G 17/00; B60S 9/12; B62D 61/12
[52] U.S. Cl. ................ 280/81 R; 180/24.02; 280/43.23; 280/405 R; 280/704
[58] Field of Search ............ 180/24.02; 280/704, 280/81 R, 81 A, 405 R, 43.23

[56] References Cited

U.S. PATENT DOCUMENTS

| | | | |
|---|---|---|---|
| 1,871,734 | 8/1932 | Prins | 180/22 |
| 3,161,418 | 12/1964 | Brennan et al. | 280/81 R |
| 3,317,193 | 2/1967 | Buelow et al. | 280/81 R |
| 3,912,293 | 10/1975 | Harbers | 280/405 R |
| 4,063,779 | 12/1977 | Martin et al. | 280/81 R |
| 4,079,798 | 3/1978 | Ferris | 180/24.02 |
| 4,082,305 | 4/1978 | Allison et al. | 280/81 R |
| 4,084,833 | 4/1978 | Mohrbacker et al. | 180/24.02 |
| 4,146,243 | 3/1979 | Sims | 280/81 R |
| 4,157,188 | 6/1979 | Sims | 280/81 R |
| 4,165,792 | 8/1979 | Hohl et al. | 280/112 R |
| 4,165,884 | 8/1979 | Allison et al. | 280/81 R |
| 4,195,856 | 4/1981 | Larson et al. | 180/24.02 |
| 4,314,709 | 2/1982 | Silbernagel | 280/81 A |
| 4,421,331 | 12/1983 | Ferris | 280/81 R |
| 4,501,437 | 2/1985 | Becker | 280/704 |
| 4,623,165 | 11/1986 | Timmers | 280/704 |

Primary Examiner—Richard A. Bertsch
Attorney, Agent, or Firm—Orrin M. Haugen; Thomas J. Nikolai; Frederick W. Niebuhr

[57] ABSTRACT

A tag axle assembly and means for mounting it to a transit concrete mixing truck are disclosed. The assembly includes a tag axle frame having a forward, longitudinally extended stem and two rearwardly extending and diverging legs. The stem is mounted to a support frame by a pivot axle to pivot about a horizontal transverse axis. The support frame in turn is attached to the truck chassis. A flexible sleeve, connected between the pivot axle and stem, allows limited stem rotation about a longitudinal axis and a vertical transverse axis, permitting wheels supported by the legs to readily adjust to uneven terrain and to follow the steering and drive wheels of the truck without transverse skidding. The tag axle assembly is pivoted between operating and raised positions by a pair of pneumatic load springs extensible to pivot the assembly downward to the operating position, and a pair of pneumatic lift springs extensible to pivot the assembly upward to the raised position. Also disclosed is a similarly mounted tandem push axle assembly.

17 Claims, 5 Drawing Figures

STEERABLE AUXILIARY AXLE

BACKGROUND OF THE INVENTION

This invention relates to auxiliary load supporting axles for wheeled vehicles, for example transit concrete mixers.

Transit concrete mixing trucks typically include a cab for the operator, and a rotatable drum behind the cab for containing and mixing the concrete ingredients. Such trucks further typically include steering wheels near the cab, and rear drive wheels often provided in a dual axle arrangement. For additional support, particularly in transit when the drum is substantially full, a mixing truck can have an auxiliary axle pivotally mounted between a raised position wherein it is carried by the truck, and a lowered or operating position wherein the auxiliary axle and its wheels share the truck's load with the steering and drive wheels, and ensure that the truck complies with state and federal gross axle weight regulations. Such an axle can be a "push" axle located ahead of the drive wheels, or a "tag" axle at the rear of the truck.

The prior art evidences various approaches for mounting auxiliary axles, not only to raise and lower such axle but permit it to adjust to uneven terrain and to follow the steering and drive wheels with minimal transverse skidding, particularly during turns. This latter feature is shown in U.S. Pat. No. 3,317,193 to Buelow et al granted May 2, 1967, in which a tag wheel assembly has a vertical shaft 70 which rotates in a vertical sleeve 68 attached to the chassis. U.S. Pat. No. 3,161,418 to Brennan et al granted Dec. 15, 1964 shows wheels with individual king pins 22 pivotally mounted to the vehicle frame. In U.S. Pat. No. 4,314,709 to Silbernagel granted Feb. 9, 1982, auxiliary wheels 51 are turned simultaneously by a tie rod 52, with vibrations damped by shock absorbers 53.

The Silbernagel Patent also shows leaf springs 40, which keep auxiliary arms 22 raised unless overcome by the force of air springs 27. U.S. Pat. No. 4,501,437 to Becker granted Feb. 26, 1985 discloses another scheme for raising and lowering a load transfer axle assembly, in which air springs 101 and 102 are used to lower the assembly, while a third air spring 120, using rods 132 and cables 134 attached to the assembly, can be extended to raise the assembly. Finally, U.S. Pat. No. 4,157,188 to Sims granted June 5, 1979 shows air bags 91 and 92 for lowering a tag axle 56, which is retracted upward by springs 90 when the air bags are not activated.

While the devices taught in these patents are satisfactory in many respects, there remains a need for a simple, low cost and reliable mounting for an auxiliary axle to conveniently move it into and out of its operating position, and to ensure tracking during turns and adjustment to uneven terrain.

It is therefore an object of the present invention to provide a low cost, reliable means for carrying an auxiliary axle on a wheeled vehicle.

Another object of the invention is to provide a mounting enclosure for an auxiliary axle that permits pivoting of the auxiliary axle into and out of an operating position about a transverse and horizontal pitch axis, and further allows limited rotation of the axle about a longitudinal roll axis for adjustment to uneven terrain.

Yet another object of the invention is to mount an auxiliary axle to provide limited rotation about a vertical yaw axis in order to allow the wheels of the auxiliary axle to track during turns, without individual castor mounting of the wheels.

Another object of the invention is to provide an auxiliary axle mounting that continually tends to center the axle relative to a vehicle chassis.

SUMMARY OF THE INVENTION

To achieve these and other objects, there is provided a control means for pivoting an auxiliary axle frame with respect to a support frame integral with the chassis of a wheeled vehicle. The auxiliary axle frame includes a generally longitudinally extended stem, and first and second opposed legs extended longitudinally away from the stem and diverging transversely from one another. The distal end portion of each of the legs is adapted to support a wheel.

The control means includes a means for mounting the stem of the axle frame for rotation, with respect to the support frame and about a first transverse axis, between an operating position with the wheels contacting the ground beneath the vehicle, and a raised position wherein the wheels are spaced apart from the ground.

The control means includes and extensible load spring means supported between the axle frame and a load bearing portion of the support frame, and extensible to force the axle frame away from the load bearing portion to its operating position. The control means further includes a lift member mounted with respect to the support frame to pivot about a second transverse axis, a linking means attached at its opposite ends to the lift member and the axle frame, and an extensible lift spring means supported between a lift portion of the support frame and the lift member, and extensible to force the lift member to pivot away from the lift portion thereby causing the linking means to move the axle frame to its raised position.

Preferably, the load bearing portion includes first and second load plates on opposite sides of the axle frame stem, and the load spring means includes a first pneumatic spring between the first load plate and first leg, and a second pneumatic spring between the second load plate and second leg.

The lift member can include a transversely extended bar and two arms at opposite ends of the bar for mounting the bar pivotally to the support frame. Further, the lift portion can include first and second lift plates on opposite sides of the stem, with the lift spring means including first and second pneumatic lift springs between the lift member and the first and second lift plates, respectively.

Another aspect of the present invention is an auxiliary axle assembly for wheeled vehicles. The axle assembly includes an auxiliary axle support frame integral with the chassis frame of an elongate wheeled vehicle, and an auxiliary axle frame including a longitudinally extended stem and two legs extended rearwardly from the stem, and diverging from one anaother.

The assembly further includes a means for mounting the stem with respect to the support frame for pivoting about a first transverse axis. The mounting means include a pivot axle rotatable with respect to the support frame about the first axis, and a spacing means between the stem and pivot axle. The spacing means is elastically deformable to permit limited stem rotation about a longitudinal axis, and limited stem rotation about a second transverse axis perpendicular to the first axis.

The assembly includes a control means for moving the axle frame between an operating position wherein wheels mounted thereto contact the ground beneath the wheeled vehicle, and a raised position with the wheels spaced apart from the ground.

The apparatus further can include a first stop means for preventing upward movement of the axle frame beyond the raised position, and second stop means for limiting downward movement of the axle frame to a predetermined position beyond the operating position. Preferably, the first stop means comprises first and second guides depending from the support frame and positioned to contact the axle frame legs and prevent further upward movement of the axle frame. The first and second guides preferably depend below and slightly ahead of the first and second legs, respectively, thereby to prevent axle frame rotation, about the second transverse axis, beyond a predetermined amount. The second stop means can include first and second limiting chains attached to the support frame and to the first and second legs, respectively.

The mounting means preferably includes a cylindrical casing surrounding the pivot axle and rotatable on the axle, and a longitudinal bushing surrounding the stem. The spacing means then comprises an elastic sleeve surrounding the bushing and mounted to the casing.

The auxiliary axle is put to use simply by extending the pneumatic load springs, thus to lower the axle frame and force its wheels against the ground. Following use, the load springs are partially evacuated and the pneumatic lift springs are activated, thus to quickly and conveniently return the axle frame to its raised position against the guides, which not only prevent further upward movement, but also serve to center the axle frame with respect to the support frame.

While in use, the axle frame readily adjusts to irregular terrain by rotating about the roll axis, a rotation readily permitted by the flexible sleeve. The sleeve also permits limited rotation about the vertical yaw axis, enabling the wheels of the auxiliary axle frame to track the steering and drive wheels of the vehicle, avoiding transverse skidding. The sleeve, when deformed, reacts against the stem to urge the axle frame back toward its centered relation to the support frame.

The guides and limit chains protect the flexible sleeve against excessive deformation in the event of extreme turns or variations in terrain. For example, the guides limit pivoting in both directions about the roll and yaw axis, as well as upward pivoting about the pitch axis. The limiting chains limit downward pivoting about the pitch axis, thus cooperating with the guides to prevent excessive movement in either pitch direction.

IN THE DRAWINGS

These and other features and advantages of the present invention are more readily appreciated upon examination of the following more detailed description in view of the drawings, in which.

DETAILED DESCRIPTION OF THE PREFERRED EMBODIMENT

Figure 1:
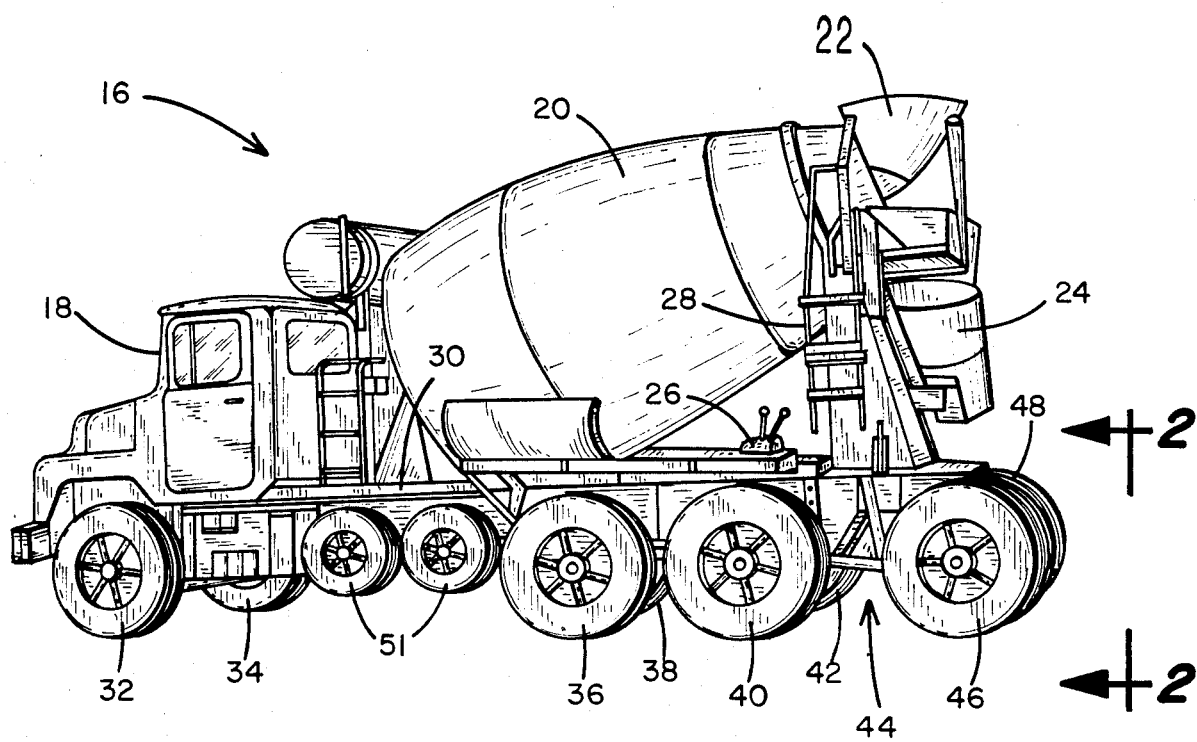
FIG. 1 is a perspective view of a transit concrete mixing truck having a tag-axle assembly constructed in accordance with the present invention.

Turning now to the drawings, there is shown in FIG. 1 a transit concrete mixing truck 16 including a forward cab 18 and a rotatable drum 20 mounted behind the cab. A hopper 22 facilitates the loading of cement, water and gravel into drum 20, through an opening at the raised rearward end of the drum. Discharge of mixed concrete occurs through the rearward opening, with the concrete guided by a movable chute 24. Discharge and drum rotation can be controlled by levers at 26, and a rearwardly mounted ladder 28 faciliates inspection and cleaning of the hopper and drum.

A chassis 30 of truck 16 supports the cab and drum, and in turn is supported by a plurality of wheels. Beneath cab 18 are steering wheels 32 and 34. Drive wheels 36, 38, 40 and 42, arranged in a dual axle configuration, support the rearward portion of chassis 30. Often, these are the only wheels necessary to provide sufficient support for the chassis.

However, additional support is required under certain conditions, for example to comply with federal and state axle weight limits and broaden the weight distribution over the chassis, particularly when drum 20 is full. Provided to meet such needs is a tag axle assembly 44 including first and second tag axle wheels 46 and 48 carried on a tubular steel tag axle frame 50. Axle frame 50 is mounted pivotally with respect to chassis 30, in order that wheels 46 and 48 may be employed only when necessary, and at other times carried by truck 16 above the ground. A tandem push axle assembly is similarly mounted to chassis 30 ahead of the drive wheels.

Figure 2:
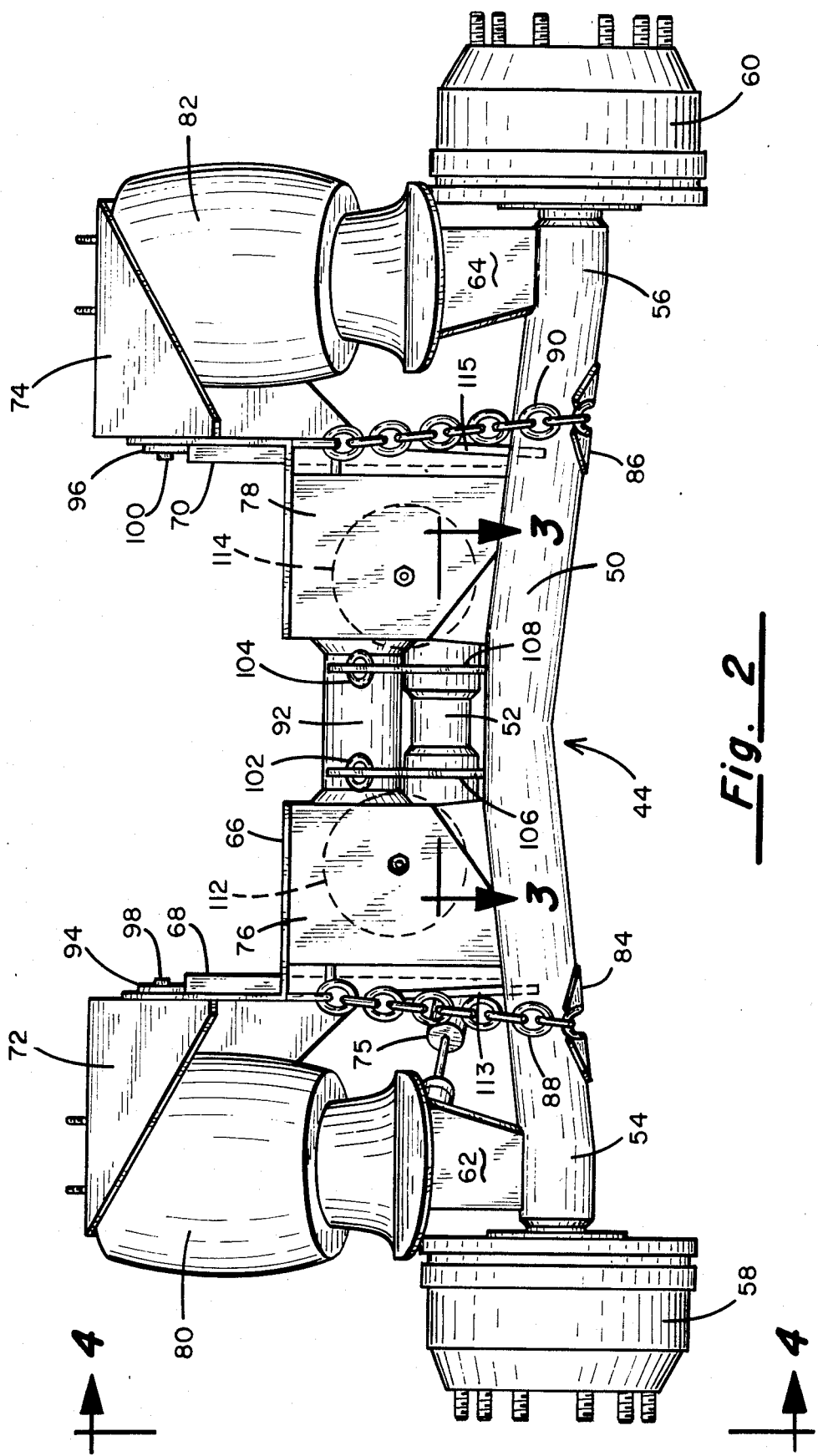
FIG. 2 is an end view of the truck of FIG. 1, taken along the line 2—2 in FIG. 1.

FIG. 2 shows tag axle assembly 44 in its lower, operating position, wherein a longitudinally extended stem 52 of frame 50 also is positioned higher than the remainder of the frame, to ensure that assembly 44 clears the truck drive line when raised. Frame 50 further includes first and second legs 54 and 56 which extend rearwardly from stem 52 and also diverge transversely from one another, thus to give tag axle frame 50 a Y-shaped or wishbone configuration when viewed from above. At the distal ends of first and second legs 54 and 56 are first and second brake drum and spindle assemblies 58 and 60, respectively. Tag axle wheels 46 and 48, not shown FIG. 2, are mounted directly to their associated assemblies 58 and 60. Also mounted near the remote ends of legs 54 and 56 are first and second load spring supports 62 and 64, respectively.

A tag axle support frame 66 is rigidly attached to chassis 30, specifically at first and second rails 68 and 70 of the chassis. Support frame 66 includes first and second load plates 72 and 74 opposite sides of stem 52. First and second lift plates 76 and 78, formed at the rear of support frame 66, are arranged on opposite sides of the stem but much closer to it.

A first pneumatic load spring 80 is held between first load spring support 62 and first load plate 72. Similarly, a second pneumatic load spring 82 is situated between second load spring support 64 and second load plate 74. Plates 72 and 74 thus combine to form a load bearing portion of support frame 66. As load springs 80 and 82 are extended simultaneously, they force tag axle frame 50 away from the load bearing portion and into the operating position. A shock absorber 75 is mounted between load spring support 62 and support frame 66 to stabilize the steering of tag axle assembly 44.

Attached to support frame 66, and to first and second chain brackets 84 and 86 on the axle frame respectively, are first and second limiting chains 88 and 90. Normally, these chains are somewhat slack, even with axle frame 50 in the operating position. However, they are shown as taut in FIG. 2 to illustrate the manner in which they permit downward travel of axle frame 50 a predetermined distance beyond the operating position, but no further. Thus, chains 88 and 90 prevent excessive load spring extension, and catastrophic downward pivoting of the axle frame if truck 16, accidentally or other wise, is driven backward to a point where tag axle wheels 46 and 48 are positioned beyond a ledge or high curb.

Mounted pivotally to support frame 66 is a lift member including a lift bar 92 supported between first and second upright and opposed arms 94 and 96, with first and second pivot pins 98 and 100 for pivotally attaching the arms to the support frame. Two lift chains 102 and 104 are attached at one end to lift bar 92, and at their other ends to first and second lift levers 106 and 108, respectively, on opposite sides of stem 52. Also mounted to bar 92 are a pair of lift spring supports, one of which is shown at 110 in FIGS. 4 and 5. First and second pneumatic lift springs 112 and 114 are positioned on opposite sides of stem 52, first lift spring 112 between lift spring support 110 and first lift plate 76, and second lift spring 114 between second lift plate 78 and the other lift spring support. Lift plates 76 and 78 combine to form a lift portion of support frame 66. Lift springs 112 and 114, when extended simultaneously, force lift bar 92 away from this lift portion to bring lift chains 102 and 104 taut, whereupon these chains act upon lift levers 106 and 108 to pivot frame 50 to the raised position. First and second guides 113 and 115 contact legs 54 and 56 at their raised position and prevent further upward travel.

Figure 3:
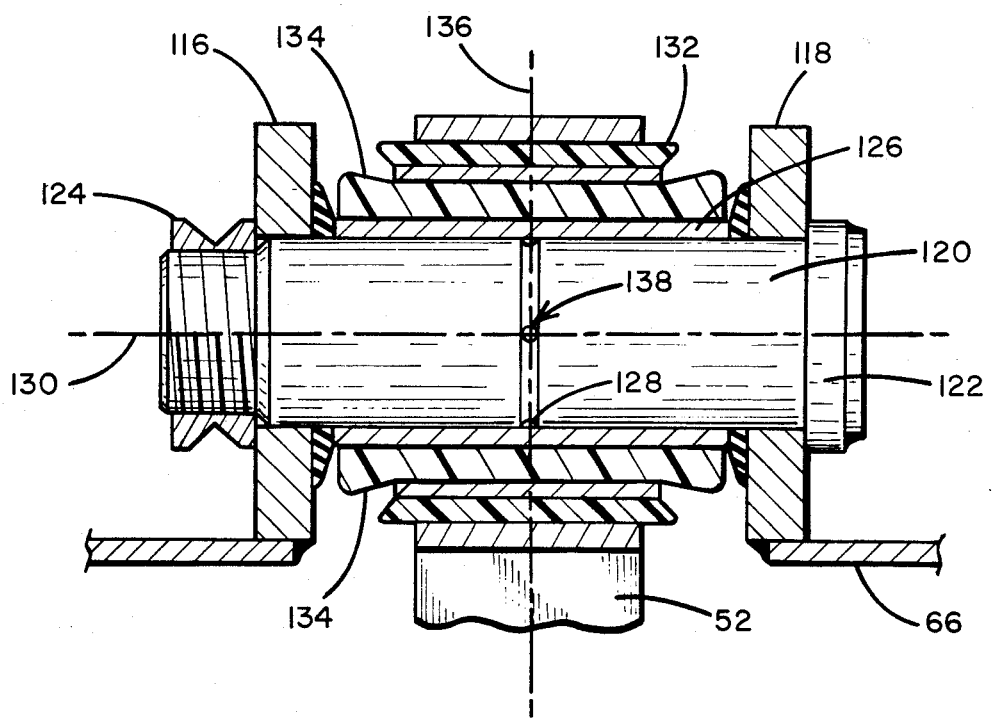
FIG. 3 is a sectional view of a portion of FIG. 2 taken along the line 3—3 in FIG. 2.

FIG. 3 shows in greater detail the apparatus for mounting tag axle frame 50, and more specifically stem 52, with respect to support frame 66. The support frame includes first and second pivot axle mounting segments 116 and 118. A pivot axle 120 is inserted through circular openings in segments 116 and 118, and held in place by a cap 112 at one end and an internally threaded fastener 124 at the other. A cylindrical casing 126 surrounds pivot axle 120 and through bushing surfaces 128, can rotate with respect to the pivot axle about a first transverse axis or pitch axis 130.

Stem 52 is housed in a cylindrical bushing 132 including a flexible sleeve 134, which in turn is mounted to casing 126. Thus, by rotation of casing 126 about pivot axle 120, stem 52 and the remainder of tag axle frame 50 can pivot about pitch axis 130 between the operating and raised positions, or occasionally downward to the extent permitted by chains 88 and 90. Sleeve 134 can be constructed of rubber or any similar material having the required elasticity. To a limited extent, sleeve 134 allows two further degrees of freedom in stem 52: rotation about a longitudinal roll axis 136, and about a second transverse yaw axis 138 which appears as a point in FIG. 3.

Figure 4:
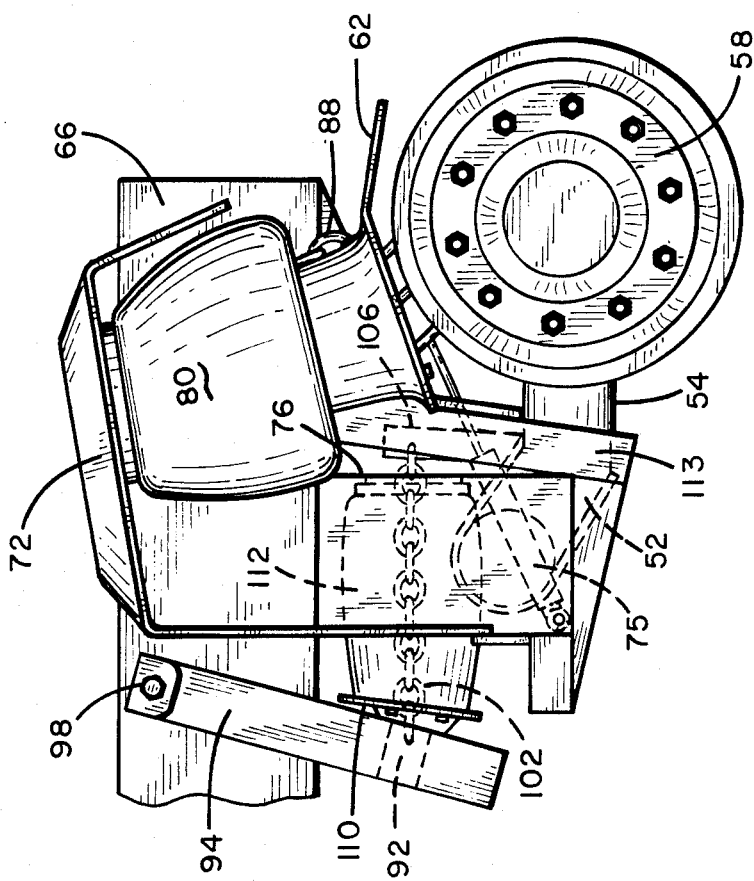
FIG. 4 is a partial side elevation taken along the line 4—4 in FIG. 2 showing the tag axle assembly in its operating position.

FIG. 4 illustrates the position of axle frame 50 with respect to support frame 66 when in its operating position. While only one side of truck 16 is illustrated, it can be appreciated that like components on the opposite side function in a substantially identical manner. When tag wheels 46 and 48 (not shown in FIG. 4) contact the ground, at least a portion of the vehicle weight is transferred from load plates 72 and 74 through pneumatic load springs 80 and 82 to wheels 46 and 48, thus to relieve the remaining wheels of a portion of the vehicle weight. Springs 80 and 82, while extended to a selected length, can deviate momentarily to accommodate slight variations in terrain, acting as shock absorbers. Pneumatic lift springs 112 and 114 are relaxed. Arms 94 and 96 are upright, and lift chains 102 and 104, while not necessarily slack, at least bear no appreciable load. The limiting chains are slack.

When in the operating position, tag axle wheels 46 and 48 readily track the steering wheels and drive wheels without transverse skidding. This is due to the yaw action of stem 52 permitted by flexible sleeve 134, which eliminates the need for mounting wheels 46 and 48 individually in castor fashion. Due to the setback of the leg distal ends from stem 52, any yaw action of the stem is substantially magnified in terms of transverse tag axle wheel movement. Consequently, only comparatively slight deformation is required in sleeve 134. Further, each of first and second guides 113 and 115, particularly at the portion horizontally aligned with its associated one of legs 54 and 56, contacts its associated leg in the event of extreme yaw to prevent any further yaw and thus prevent damage to sleeve 134. As sleeve 134 is deformed, it stores energy which increases with the amount of deformation, acting as a spring to urge axle frame 50 back toward it centered position which is the stress-free position for the sleeve. Thus sleeve 134, in cooperation with shock absorber 75, reduces fishtailing and other unwanted drift.

The roll action through flexible sleeve 134 enables rapid adjustment of axle frame 50 to uneven terrain which lifts one of wheels 46 and 48 above the other. Again, sleeve 134, when deformed, functions as a spring to urge the axle frame back to its level orientation. Guides 113 and 115 protect against excessive roll as well, with the particular guide associated with the higher tag axle wheel contacting the associated one of legs 52 and 54 to prevent further upward movement of the leg relative to support frame 66.

Figure 5:
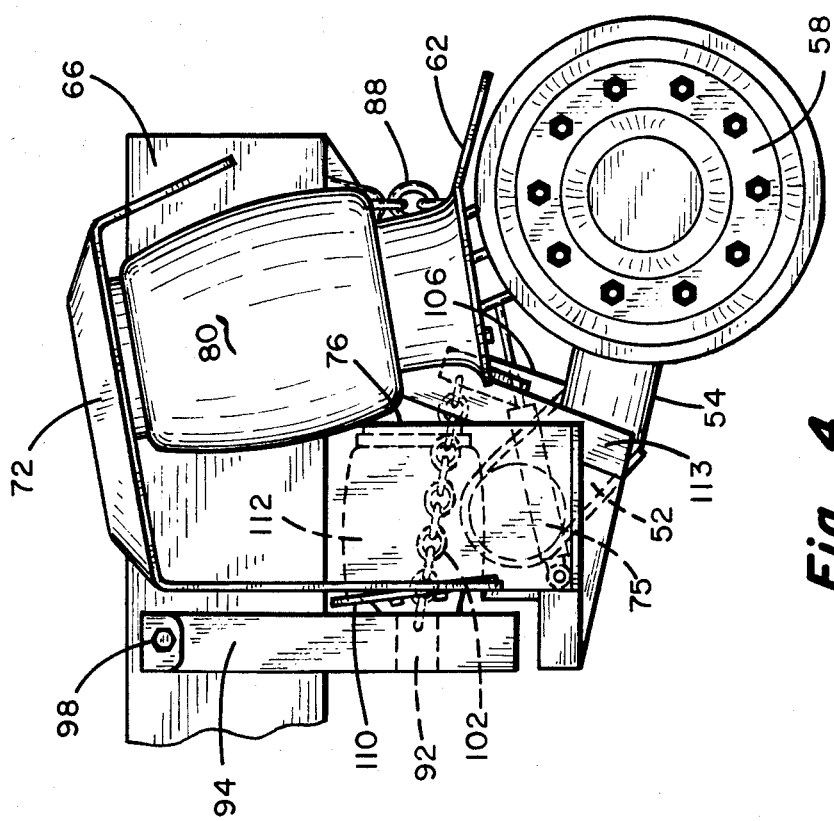
FIG. 5 is a view similar to that of FIG. 4, but showing the tag axle assembly in its raised position.

When the added support of tag wheels 46 and 48 is no longer needed, tag axle frame 50 can be moved to the raised position shown in FIG. 5, essentially by extending pneumatic lift springs 112 and 114 and evacuating some of the air from pneumatic load springs 80 and 82. Lift spring extension pivots arms 94 and 96 clockwise as viewed in FIGS. 4 and 5, essentially moving lift bar 92 forward. This tightens lift chains 102 and 104, whereupon they act upon lift levers 106 and 108 to rotate axle frame 50, counterclockwise about pivot axle 120 until the tops of first and second legs 54 and 56 abut guides 113 and 115, respectively, at which point the tag axle assembly has reached the raised position.

It is to be appreciated that while the specific embodiment described is for tag axle assembly 44, the structure of push axle assembly 51 is substantially the same, except that one shock absorber such as shock absorber 75 is needed for each axle of the tandem assembly. Hence, the present invention can readily be embodied in push axles located beneath the chassis and ahead of the drive wheels.

When in its operating position, an auxiliary axle mounted in accordance with the present invention readily tracks vehicle steering and drive wheels, even during sharp turns. The flexible sleeve permits such tracking, and further urges the axle frame back toward its centered position to prevent unwanted drift. Likewise, the flexible sleeve permits a rolling action to adjust to uneven terrain, yet urges the axle frame, whenever skewed by roll, back to its level configuration. Finally, the combination of chains and pneumatic springs for alternatively loading and lifting the axle provide a simple and reliable system for axle position control.

What is claimed is:

1. In combination with a wheeled vehicle including a chassis and a support frame integral with the chassis; and auxiliary axle frame having a generally longitudinally extended stem, and first and second opposed legs extended longitudinally away from the stem and diverging transversely from one another, with the legs at their distal ends adapted to support wheels; and a pivot means for mounting the stem with respect to the support frame for rotation about a first transverse axis:

a control apparatus for pivoting said auxiliary axle frame, with respect to the support frame, between and operating position with said wheels contacting the ground beneath the vehicle, and a raised position wherein the wheels are spaced from the ground; said control means including:

a pneumatic load spring means supported between said axle frame and a load bearing portion of said support frame and extensible to force said axle frame away from said load bearing portion to the operating position;

a lift member mounted on said support frame to pivot with respect to said frame, a linking means mounted at its opposite ends to said lift member and said axle frame, and a pneumatic lift spring means supported between a lift portion of said support frame and said lift member, and extensible to force said lift member to pivot away from said lift portion thereby causing said linking means to move said axle frame to the raised position.

2. The control apparatus of claim 1 wherein:
said load bearing portion includes first and second load plates on opposite sides of said stem, and wherein said load spring means includes first and second pneumatic load springs supported between said axle frame and said first and second load plates, respectively.

3. The apparatus of claim 2 wherein:
said lift member includes a transversely extended bar and two arms at opposite ends of said bar for supporting the bar pivotally relative to said support frame.

4. The apparatus of claim 2 wherein:
said lift portion includes first and second lift plates on opposite sides of said stem; said lift spring means includes first and second pneumatic lift springs between said lift member and said first and second lift plates, respectively; and said linking means includes two lift chains on opposite sides of said stem, and two linking levers mounted to said axle frame, one lever attached to each lift chain.

5. The apparatus of claim 1 including:
a first stop means for preventing movement of said axle frame upward beyond said raised position, and a second stop means for limiting downward movement of said axle frame to a predetermined distance beyond said operating position.

6. The apparatus of claim 5 wherein:
said first stop means includes first and second guides depending from said support frame and positioned to contact said legs to prevent further upward movement of the legs.

7. The apparatus of claim 5 wherein:
said second stop means includes first and second limiting chains on opposite sides of said stem and attached at opposite ends to said support frame and to said first and second legs, respectively.

8. An auxiliary axle assembly for wheeled vehicles including:
an auxiliary axle support frame integral with the chassis of an elongate wheeled vehicle;
an auxiliary axle frame including a longitudinally extended stem and a transversely diverging frame portion extended rearwardly from the stem;
a means for mounting said stem with respect to said support frame to pivot about a first substantially transverse axis, said mounting means including a pivot axle extended in said first transverse direction, and a spacing means between said stem and said pivot axle, said spacing means elastically deformable to permit limited rotation by said stem about a longitudinal axis and a second transverse axis normal to said first transverse axis; and
a control means for moving said axle frame between an operating position with said wheels contacting the ground beneath the wheeled vehicle, and a raised position with said wheels above the ground.

9. The axle assembly of claim 8 including:
a casing surrounding said pivot axle and rotatable thereon, and a longitudinal bushing enclosing and integral with said stem; said spacing means comprising an elastic sleeve surrounding said bushing and attached to said casing.

10. The apparatus of claim 9 further including:
first and second guides depending from said support frame and positioned to contact said frame portion and thereby prevent further upward movement of said axle frame beyond said raised position.

11. The assembly of claim 10 wherein:
said first and second guides further are positioned to limit the amount of pivoting of said axle frame about said second transverse axis.

12. The assembly of claim 11 wherein:
said first and second guides further are positioned to limit the amount of axle frame rotation about said longitudinal axis.

13. The assembly of claim 12 including:
a shock absorbing means mounted between said support frame and said axle frame for assisting in stabilizing axle frame rotation about said longitudinal axis.

14. The assembly of claim 8 wherein said control means includes:
a load spring means supported between said axle and a load bearing portion of said support frame and extensible to force said axle frame away from said load bearing portion to the operating position;
a lift member supported for reciprocating movement with respect to said support frame;
a linking means mounted at opposite ends to the lift member and the axle frame; and
a lift spring means supported between a lift portion of said support frame and said lift member, said lift spring means extensible to force the lift member away from said lift portion thereby to cause the linking means to move said axle frame to the raised position.

15. The assembly of claim 14 wherein:

said load bearing portion includes first and second load plates on opposite sides of said stem, and said load spring means includes first and second pneumatic load springs supported between said diverging frame portion and said first and second load plates, respectively.

16. The assembly of claim 15 wherein:

said lift portion includes first and second lift plates on opposite sides of said stem, and said lift spring means includes first and second pneumatic lift springs positioned between said lift member and said first and second lift plates, respectively.

17. The assembly of claim 16 wherein:

said stem is offset upwardly of said diverging frame portion when said axle frame is in its operating position.

* * * * *